Feb. 12, 1935.  M. J. CALLAHAN  1,990,895
THERMAL CONTROL UNIT FOR HEATING AND VENTILATING APPARATUS
Filed July 13, 1929  4 Sheets-Sheet 2
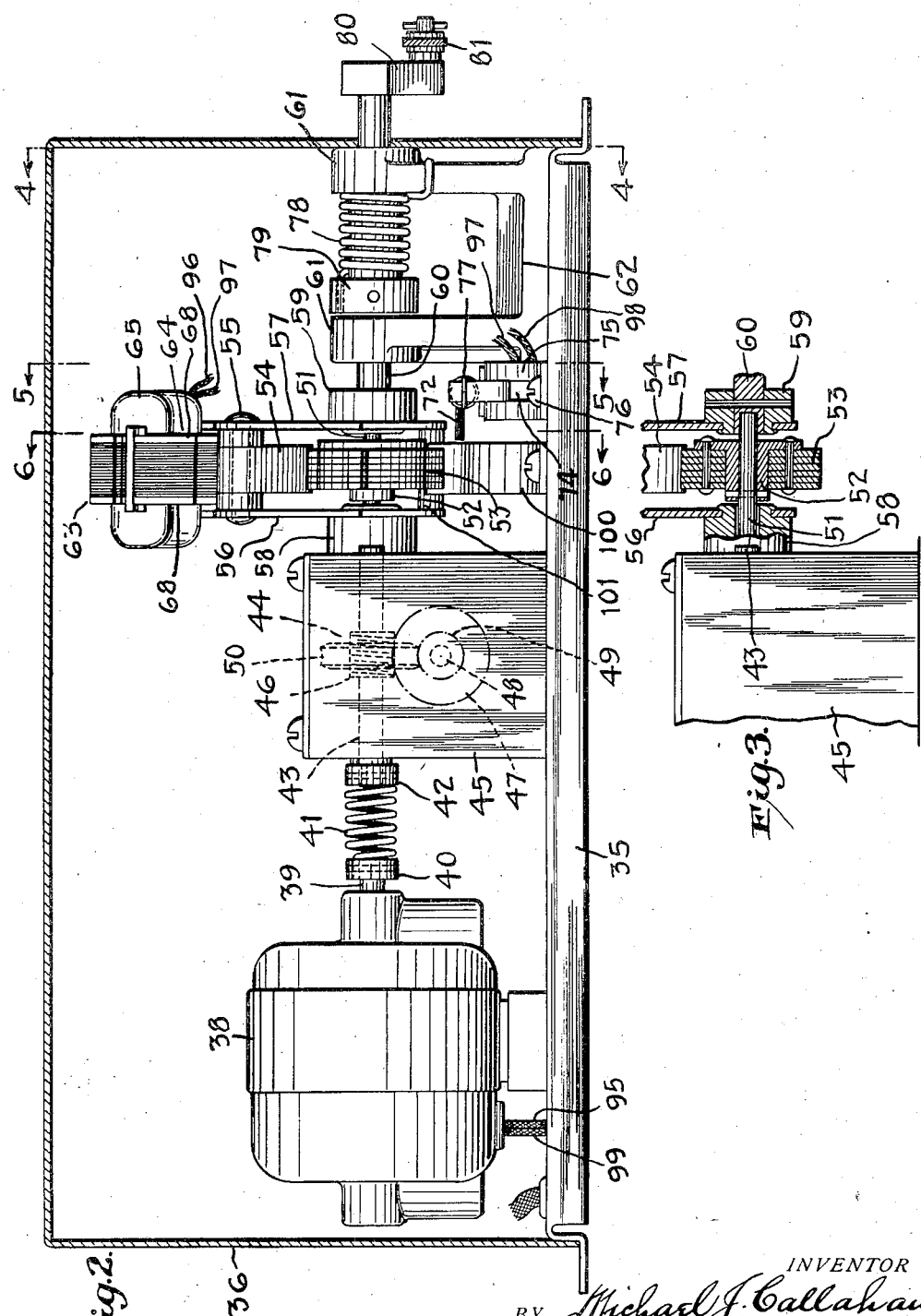
INVENTOR
Michael J. Callahan
BY
Chas. McC. Chapman
ATTORNEY

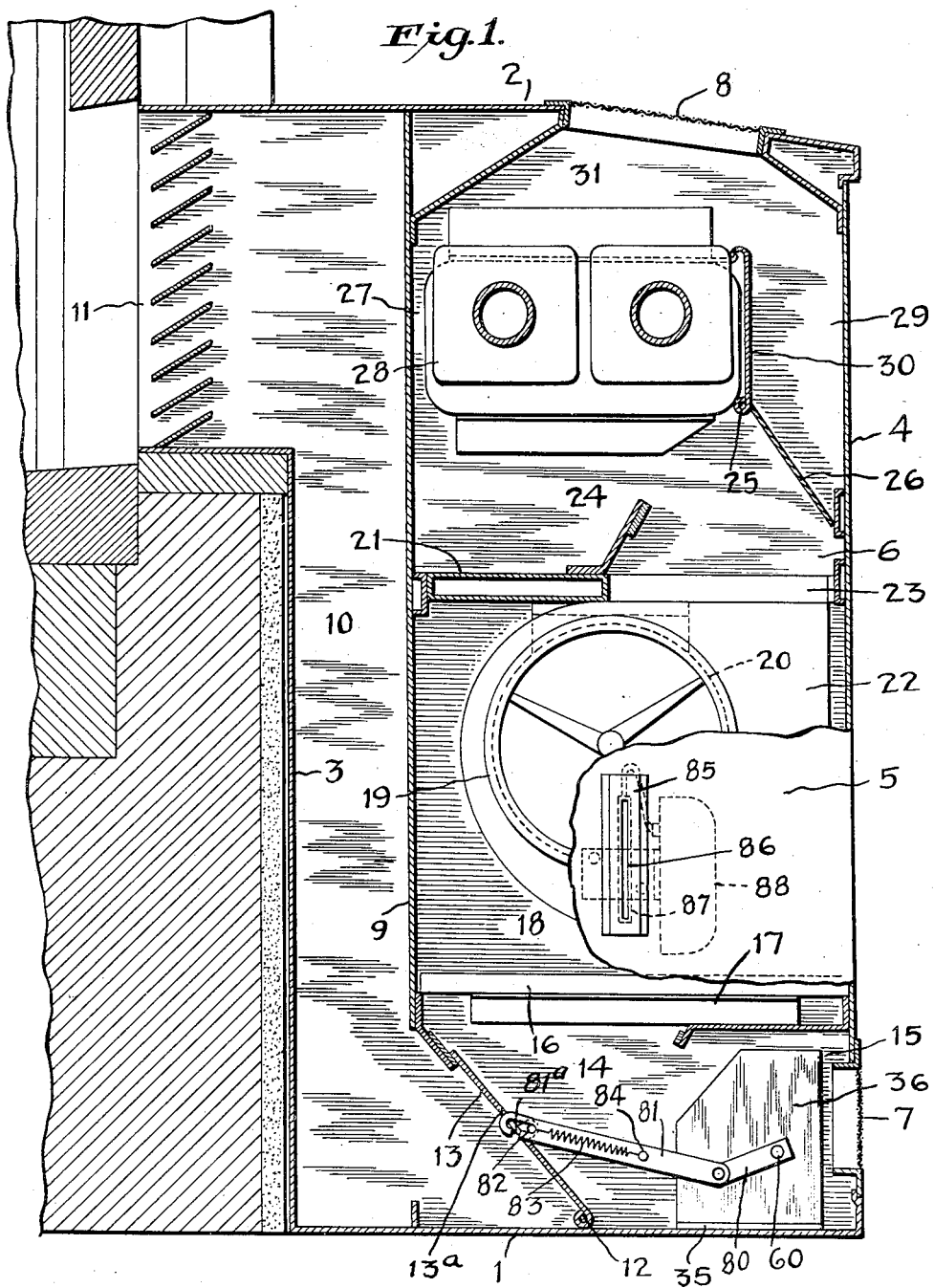

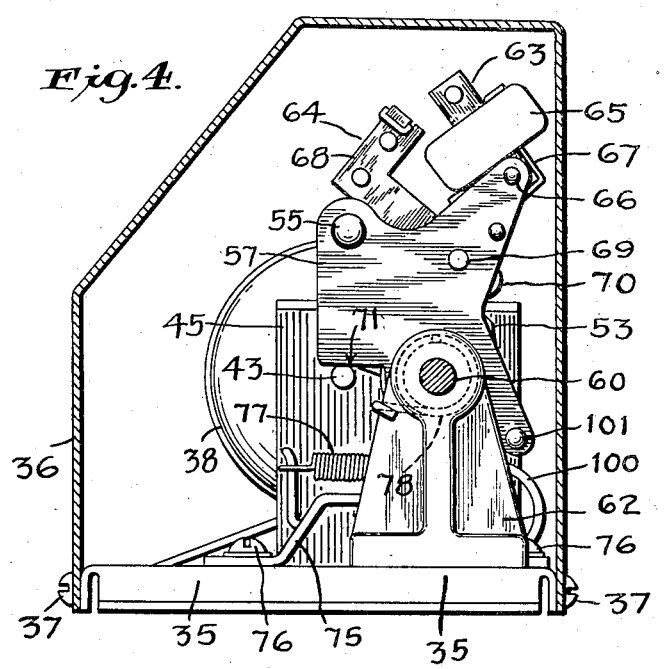
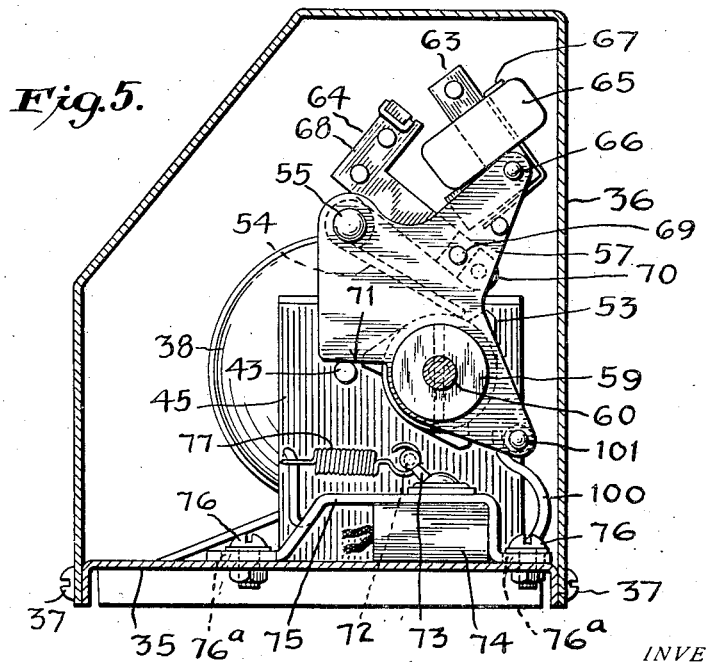

UNITED STATES PATENT OFFICE 1,990,895

THERMAL CONTROL UNIT FOR HEATING AND VENTILATING APPARATUS

Michael J. Callahan, Bridgeport, Conn.; Arthur V. Dearden and Elmer E. Wigg, executors of said Michael J. Callahan, deceased, assignors to Peerless Unit Ventilation Co. Inc., Bridgeport, Conn.

Application July 13, 1929, Serial No. 378,049

16 Claims. (Cl. 257—137)

This invention relates to the art of heating and ventilating, and, particularly, has reference to a mechanism for automatically controlling the inlet damper thereof so as to bring about, within the unit, certain modes of operation which will result in the control of the temperature of the air delivered into the room of installation during the active period of use of the unit, and which will also regulate and control the operation of the unit during the inactive period of its use. My improved mechanism, by reason of its control of the inlet or fresh air or cold air damper, also makes my unit responsive, sensitively, to temperature variations and changes of the room of installation of the unit, so that the latter will perform as just stated.

The heating and ventilating "unit", in contradistinction to central heating plants, is now almost universally in use for controlling the temperature of schoolrooms, buildings, hotels, lecture halls and other structures fabrics, and has, in the connections noted, practically supplanted the central fan or split systems. The unit system, on account of its many advantages, has become established because of its economy, its ability to ventilate as well as heat and control the temperature of the room or space ventilated, and because of its flexibility of use and control, as compared with the control of the central fan and split systems. Moreover, the unit system has greater simplicity, is more accurate in its work, is more definite in its functions, and is far more economical in installation and maintenance than the central fan and split systems, and has practically revolutionized the structure of buildings in which it is installed by the elimination of ducts, flues, wiring, machinery rooms, excavations, and great head room required in the use of the central fan and split systems.

In my Patent #1,825,689, granted October 6, 1931, I have disclosed a construction of heating and ventilating unit which is automatically controlled in all its functions and which is self-contained, so as to eliminate the control of certain of its elements from a central or outside station. In said unit, the structure is such that the pipings, conduits, wall grooves, compressed air plants, pumps and various other devices and means of the usual systems are eliminated.

It is among the objects of my present invention to provide a unit through the medium of which the temperature of the air in the room or space of installation of the unit can be controlled, and said temperature in turn can be utilized to control the admission of fresh cold air into the unit; to provide a unit of the type noted with an inlet or damper chamber at its bottom in which is located a thermally controlled unit, which in turn will automatically control the opening and closing of the inlet or cold air damper; to provide a unit of the type noted in the foregoing wherein the inlet duct is continued along the length of the unit structure to the bottom of the latter where it terminates in a damper chamber, said chamber being closed at one side to shut off the admission of cold air and closed at the other side to shut off the admission of cool air in the room of installation which is utilized for recirculation purposes, said openings being controlled by a single damper, in turn controlled by a thermal unit, the control of which is brought about by a thermal switch which is caused to operate by variations in the temperature of the room of installation; to provide a heating and ventilating unit having a discharge chamber at its top, heating and by-pass chambers communicating with the discharge chamber, a mixing damper adapted to control the admission of air to the heating and by-pass chambers, a motor and blower chamber below the mixing damper and the cold air chamber in which it operates, a thermal switch mechanism located in or adjacent the motor and blower chamber, an air inlet or damper chamber below the motor and blower chamber having a plurality of openings controlled by a single damper and containing a thermal control unit for actuating the damper, and a fresh air inlet passage extending the entire length approximately of the unit and communicating with one side or end of the inlet or damper chamber; to provide a heating and ventilating unit with an inlet passage extending the length of the unit and communicating with a damper chamber, the entrances to which are controlled by a single damper under control of a thermal unit located in the chamber, said unit in turn being controlled by a thermal switch, sensitive to variations of temperature, located in the most available part of the unit for rendering it susceptible to temperature variations and changes; to provide a heating and ventilating unit with a control means for the inlet damper, which operates automatically under control of temperature variations in the room of installation, through the medium of a thermal unit controlled in its action by a thermal switch; to provide a unit of the type noted with an inlet damper under control of a thermal unit, which acts to positively close the damper against the admission of cold air and acts to yieldingly open the damper for the admission of cold air; to provide a unit of the type noted having an inlet damper under control of a thermal unit embodying a high revolution motor, a reduction gear, and a flexible driving means between the two so that the rapid revolutions of the motor will impose no strain upon the reduction gear; to provide a unit of the type noted having an inlet damper under control of a thermal unit embodying a motor, a reduction gear, a flexible connection between the two, a ratchet driven by the gear, and a magnetic means electrically controlled for positively driving the connections therefrom to the inlet damper; and to provide a unit of the type noted wherein a thermal control unit embodying a high revolution motor is employed under control of a thermal switch to manipulate an inlet damper for the admission of fresh air, and for the control of recirculation through the unit independently of the motor which drives the blowers for projecting the air entering the unit from the latter into the room of installation.

With the above objects in view and others which will be detailed during the course of this description, my invention consists in the parts, elements, mechanisms and combinations thereof hereinafter described and claimed.

In order that my invention may be clearly understood, I have provided drawings in which:

Figure 1 is a view in vertical section of a heating and ventilating unit embodying my invention, the section being taken adjacent one of the end walls of the unit and with part of one of said end walls in elevation;

Figure 2 is a view in elevation of the control unit looking from the rear and with its casing in section;

Figure 3 is a fragmentary detail view, partly in elevation and partly in section, of part of the control unit;

Figure 4 is a view in end elevation of the control unit with the casing in section, taken on line 4—4 of Figure 2;

Figure 5 is a cross-sectional view of the control unit and is taken on line 5—5 of Figure 2, the parts being in the position they would assume with the fresh air inlet damper closed;

Figure 6:
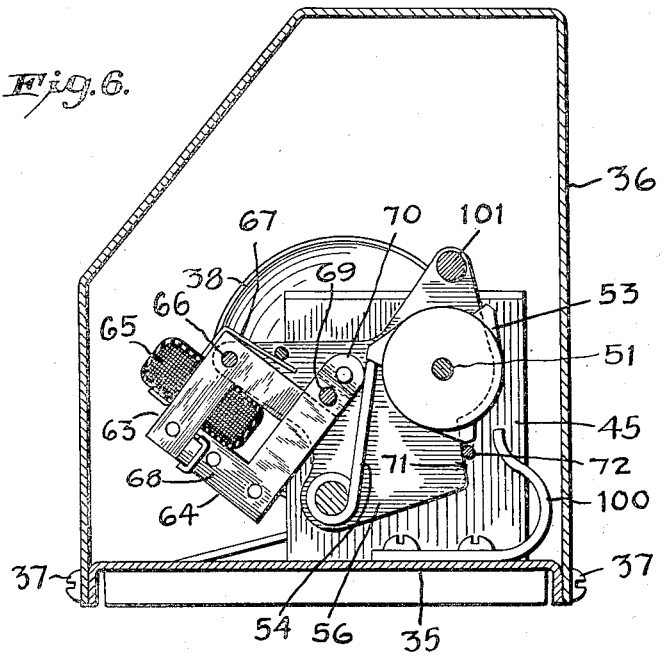
Figure 6 is a cross-sectional view taken on line 6—6 of Figure 2, the parts being in the position they would assume with the inlet damper open.

Referring to the drawings and particularly to Figure 1, the numeral 1 designates the bottom of the casing of the ventilating unit which is substantially rectangular in form. The top of the casing is indicated at 2, the back of the casing at 3 and its front at 4. The opposite end members of the casing are shown at 5 and 6. The bottom of the front member of the casing is provided with a recirculating inlet opening covered by a grille 7, through which the cold air, which seeks the floor within the room of installation of the unit, may be drawn for recirculating purposes. The top of the casing is provided with a discharge opening covered by a grille 8, through which the hot, cold or tempered air is discharged into the room of installation in a vertical jet.

Suitably spaced from the rear wall 3 of the casing is a partition 9 which defines a downwardly extending fresh air passage 10. An inlet 11, leading to a window or other suitable opening, in the wall communicating with the outside of the building, provides the means for admitting cold air. At the bottom of the passage 10, pivoted at 12, is a damper 13 which opens into an inlet or damper chamber 14. This damper 13, which will be termed the inlet damper, is actuated by the control unit 15, which is located in the chamber 14 and forms an important feature of the invention. The control unit is illustrated in detail in Figures 2 to 6 and will be described hereinafter.

The top of the inlet or damper chamber 14 is defined by a filter 16 of viscous composition, so that the air, entering the unit, will be filtered before it is discharged from the top thereof. The filter is supported by end bars or angles 17 secured to the end walls 5 and 6. Above the filter is a blower chamber 18, in which are located the blowers 19 and motor 20, which operates the same. The blowers and motor are underslung from the platform 21 which is suitably supported on the end walls of the casing. The blowers are enclosed by casings 22 forming ducts for the air drawn at the eyes of the blowers, the latter being centrifugal in character, and discharged through an opening 23 in the platform 21.

The top of the blower chamber 18 is defined by the platform 21 which also defines the bottom of the cold air chamber 24. Located toward the front of the cold air chamber 24 and pivoted at 25 is the mixing damper 26. Above the chamber 24, or in what might be termed the upper part thereof, is the heating chamber 27 containing the heating element or radiator 28 suitably supported therein. Forward of the heating chamber 27 is a by-pass chamber, passage or conduit 29, the heating and by-pass chambers being defined by the partition 30 and the partition 9 and front wall 4, respectively. The pivot for the mixing damper 26 is located at the bottom of the partition 30 so that the damper may freely swing in the chamber 24 which freely communicates with the heating and by-pass chambers. Above the heating and by-pass chambers is a hot air or mixing chamber 31, into which the hot air from the heating chamber is discharged, and into which the cold air is discharged from the by-pass chamber. The air then passes from the mixing chamber through the grille 8 into the room. The mixing damper 26 and the heating element may be operated and controlled in operation in any suitable manner.

The control unit 15, which actuates the inlet damper 13, will now be described. The mechanism of the control unit is mounted on a base 35 which is secured to the floor or bottom 1 of the casing and is enclosed by a cover 36 which is secured by screws 37 to the base 35. Mounted on one end of the base 35 is a motor 38. Secured on the shaft 39 of the motor is a bushing 40, to which one end of a coiled spring, or flexible, coupling 41 is fastened. The opposite end of the coupling 41 is secured to a bushing 42 which is mounted on shaft 43 forming part of a reduction gearing 44 mounted in the housing 45 which is secured to the base 35. The motor 38, preferably being a high speed motor, the spring coupling 41 acts as a resilient connection between the motor and the reduction gearing so as to insure against the motor being strained when started at high speed. The reduction gearing 44 may be of any well known type and as illustrated comprises two pairs of worms and worm wheels. The worm 46 is mounted on the shaft 43 and meshes with a worm wheel 47 secured on a shaft 48 running at right-angles to shaft 43. The shaft 48 also carries a worm 49 which meshes with a worm wheel 50 on the shaft 51.

The shaft 51 which extends through the housing 45 has pinned, or otherwise, secured to it a sleeve 52 upon which is mounted a three-toothed, a composite ratchet 53. This ratchet might be provided with more or less than three teeth if desired. For economy of manufacture, the ratchet is made up of a plurality of disks suitably held together. The shaft 51 preferably terminates adjacent the ratchet 53.

The ratchet 53 is engaged by a heavy spring pawl 54 which is fixed at 55 in a cradle composed of two members 56 and 57. The member 56 is secured to a collar 58 which is freely mounted on the shaft 51, and the member 57 is secured to a similar collar 59 which is pinned or otherwise secured to a shaft 60, mounted in bearings 61 formed in a bracket 62 which is secured to the base 35. The driven shaft 51 rotates in a counter-clockwise direction, in respect to Figures 4, 5 and 6, and it will now be apparent that when the motor is started the cradle will be swung in a counter-clockwise direction. This movement will open the intake damper 13 by mechanism hereinafter described.

Means are provided for breaking the motor circuit immediately upon the damper being opened and holding the damper in its open position until the temperature of the room has dropped to the desired predetermined point. Breaking the motor circuit after the damper has been opened effects a great saving in electric power consumption, as it is only necessary for the motor to function for the few seconds taken to open the damper. Secured in the upper part of the cradle is a magnet which is composed of a relatively fixed or stationary half 63, and a movable half 64. The fixed half is composed of laminations surrounded by a coil 65, and is secured in the cradle by a rivet 66. An angular strip 67 holds the coil 65 in its proper position on the magnet. The movable half of the magnet, which is also composed of laminations and side pieces 68 is pivoted at 69 in the cradle. When the magnet is not energized, the movable half rests against the bearing for the pawl 54. The side pieces 68 of the movable half of the magnet terminate in a tail 70 which presses against the pawl 54 when the magnet is energized, and the two halves are drawn together.

When the energizing circuit is completed in the control unit, the motor is started and the magnet is energized, the two members engaging. As heretofore stated, the cradle will be swung by virtue of the pawl 54 engaging one of the teeth of the ratchet 53. The pawl will be kept in contact with the ratchet tooth by the magnet tail 70. A stop edge 71 on the cradle contacts with a pin 72 just prior to the cradle arriving at the position shown in Fig. 6. This pin 72 projects from the operating member 73 of a snap switch 74. The switch is of well known character and is not illustrated in detail. This switch controls the motor, and, as soon as the switch is operated, the motor circuit is broken. The magnet circuit, however, remains closed, and the pawl 54 is held in contact with the tooth of the ratchet 53, as stated. The reduction gearing 44 will prevent the cradle returning to the position of Figures 4 and 5, and the damper 13 will be held open. When the magnet circuit is broken, the parts of the magnet will separate, the pawl 54 will be released by tail 70, and by its resiliency the pawl may then move away from the tooth of the ratchet and the cradle will return to its normal position. The switch 74 is mounted on bracket 75 secured to the base 35 by screws 76.

The screws 76 pass through slots 76$^a$ in the bracket 75, so that the position of the pin 72 may be properly adjusted. A spring 77 closes the switch 74 after the cradle has returned to its normal position, so that the parts will be in proper position for the next cycle of operation.

Viewing Figure 2, one end of strong spring 78 is secured to a collar 79 mounted on the shaft 60. The other end of the spring 78 engages one of the bearings 61 for the shaft 60. This spring normally tends to hold the intake damper in a closed position, as in Figure 1, and to turn the cradle in a clockwise direction. The outer end of the shaft 60 has secured to it an arm 80, which has pivoted to its free end a link 81. The opposite end of the link 81 passes freely through a slot 13$^a$ in the damper 13, and is provided with a slot 81$^a$ in which rides a bar 82 carried by the damper. A spring 83 has one end secured to a pin 84 on the link 81 and its opposite end to the bar 82. This spring acts as a compensating means, so as to take care of any irregularities in closing the damper, and prevents the motor being strained in case the damper closes ahead of the cut off time of the switch. This connection is in the nature of a toggle joint between shaft 60 and the damper.

The means for completing or breaking the circuit to the controlled unit is similar to that disclosed in my said Patent #1,825,689. A slot is formed in the end wall 5 of the casing, Figure 1, and covering the slot is a convexed housing plate 85 having an elongated slot 86. Between the two slots is located a thermal tube 87 which is connected to an automatic controller 88, for temperature and pressure, of a well known type, Figures 1 and 7. The action of this controller is to quickly shift a switch so as to close a circuit when the temperature rises to a predetermined point, and open the circuit when the temperature drops to a predetermined point.

A brief description will now be given, of the operation, particular attention being directed to the wiring diagram shown in Figure 7: The wires 89, 90 designate the mains which may lead to a suitable source of electric energy. A switch 91 is utilized for manually closing or opening the main circuit. The motor 20 which drives the blowers is connected in shunt to the mains, by leads 92 and 93, and when switch 91 is closed the motor will be in continuous operation and the blowers will draw air into the unit either through the passage 10 to chamber 14, or into the latter through the opening 7 for recirculation, and will drive the air through the discharge opening 8 in a vertical jet. The mixing damper may be operated by hand or automatically to meet conditions of temperature in the room of installation of the unit. These operations are not affected by the thermal switch 87—88. A lead 94, from the positive main 92, runs to the automatic controller 88 in which is housed a switch. Wires 95—96 lead from this switch to the coil of the magnet 65, which is connected by wires 97 to the switch 74, connected by lead 98 to negative side of motor 38, the positive side of which is connected to lead 96. The negative side of switch is also connected by lead 99 to the negative main 93. Thus the thermal control unit is connected in shunt to the mains 92—93. Hence, when the switch 91 is closed and the temperature in the room of installation rises, the circuit through the thermal control unit will be closed by the thermal switch 88, and since the snap-switch 74 is normally closed, the high revolution motor 38 will go into action rotating shaft 39, flexible coupling 41, reduction gearing, and shaft 51. The ratchet 53 on this shaft will be turned and since the magnet parts 63—64 have closed, the pawl 54 will be engaged by one of the ratchet teeth, thus turning the cradle 56—57 to the position shown in Figure 6. The turning of shaft 51 causes shaft 60 to turn, thus turning crank 80, actuating arm 81 and shifting the inlet damper 13 to closed position and cutting off the admission of fresh or cold air, as in Figure 1. As the stop edge 71 engages the switch pin 72, Figure 6, the switch 74 will be opened and the circuit to motor 38 will be broken and the motor will stop. Since the opening of switch 74 does not open the circuit through the latter by way of leads 97—99, the magnet remains energized and its parts remain closed and the damper is held closed by the ratchet 53 against the pull of the spring 78. When the temperature in the room drops sufficiently, the controller 88 will operate to open the circuit and the magnet will be deenergized. This will allow the pawl 54 to leave the ratchet 53 and the cradle will be returned by the spring 78 to the position shown in Figures 4 and 5. A stop 100 secured to the base 35 and cooperating with a pin 101 on the cradle prevents the cradle moving too far. At the same time as the cradle is being returned, the intake damper is being opened. When the cradle returns to its normal position, the spring 77 closes the snap switch 74, so that the parts of the control unit will be in the proper position to function when the temperature again rises.

Figure 7:
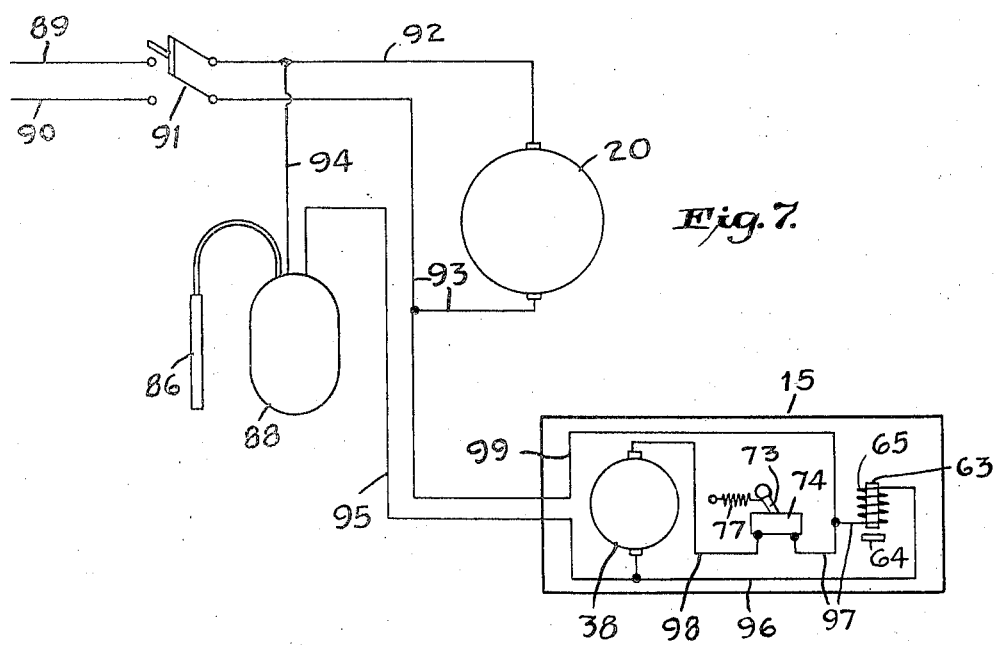
Figure 7 is a diagrammatic view of the wiring layout.

As noted in the foregoing with reference to Figure 6, the edge 71 of the cradle is caused to engage the switch pin 72 for the purpose of opening the switch, stopping the motor 38 and continuing the magnet in operation for the purpose of holding the inlet damper 13 in its open position. After this function has been accomplished, it is no longer necessary to utilize a strong current from the mains to continue the magnet in operation. Therefore, instead of using a simple switch, such as 74, a current reduction device may be employed in the form of a step down transformer. Such device will prevent wastage of current while the magnets are maintaining the damper in its open position.

Having thus described my invention, what I claim and desire to secure by Letters Patent is:

1. A heating and ventilating unit comprising a casing having at its bottom an air inlet chamber, a motor and blower chamber, a heating chamber, a by-pass chamber, a discharge chamber, and an outlet therefrom, and a cold air inlet passage at the back of the casing at its top and extending the entire vertical length of the casing and communicating with the said inlet chamber.

2. A unit for heating and ventilating purposes wherein the inlet chamber has a finite opening in its top, an opening in its front and an opening in its rear, a single damper operating to close the opening in its rear so that air may pass through the front and through the opening in the top, and also operating to uncover the opening in the rear and to cut off the passage of air through the chamber from the front and enable the air to pass directly through the opening in its top, and means for actuating the damper whereby to perform the functions noted.

3. A heating and ventilating unit having a cold air inlet chamber provided with a plurality of openings, a damper for controlling the functions of said openings, and means for actuating the damper including a thermal control unit embodying a high revolution motor, and thermal means for controlling the operations of the motor.

4. A heating and ventilating unit having a cold air chamber provided with a plurality of openings, a damper for controlling the functions of said openings, and means in said chamber for actuating the damper including a thermal control unit, and a thermal switch mounted on the casing for controlling the action of the thermal unit.

5. A heating and ventilating unit having a cold air inlet chamber provided with a plurality of openings, a damper for controlling the functions of said openings, and means for actuating the damper including a thermal control unit embodying a magnetic switch having a pawl and a rotary ratchet for engaging the pawl, and connections to the damper.

6. A heating and ventilating unit having a cold air inlet chamber provided with a plurality of openings, a single damper for controlling the functions of said openings, means for actuating the damper, whereby air may be admitted at the rear of the chamber and directed through the unit, or air may be admitted at the front of the unit and thus directed, and said damper actuating means including a thermal control switch, a thermal control unit having a high revolution motor, and an actuating connection from said unit to the damper.

7. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and said damper actuating means including a thermal control switch, a thermal control unit having a high revolution motor, and reduction gearing, and a flexible connection between the two.

8. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and said damper actuating means including a thermal control switch, a thermal control unit embodying a magnetic switch-controlled pawl and ratchet mechanism, and an actuating connection from said unit to the damper.

9. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and said damper actuating means including a thermal control unit embodying a magnetically controlled pawl and ratchet mechanism, and an actuating connection from said unit to the damper.

10. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and said damper actuating means including a thermal control unit embodying a high revolution motor, a reduction gearing, a flexible connection between the latter and the motor, a magnetic switch, and a connection from the latter to the damper for actuating the latter.

11. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and said damper actuating means including a thermal control unit embodying a driving motor, a positively driven shaft, a flexible connection between said shaft and motor, and an actuating connection from said shaft to the damper.

12. A heating and ventilating unit having a cold air chamber and a damper for controlling the functions thereof, and means for actuating the damper embodying a thermal control unit having a high revolution motor, a magnetic switch including a pawl and ratchet mechanism, and means for actuating the pawl and ratchet mechanism from the motor including a flexible connection and a reduction gearing.

13. A heating and ventilating unit having a cold air inlet chamber provided with a plurality of openings, a single damper for controlling the functions of said openings, and means for actuating the damper, whereby air may be admitted at the rear of the chamber and directed through the unit, or air may be admitted at the front of the unit and thus directed, and a thermal control means located in the damper chamber for activating the damper actuating means including connections between the damper and control means.

14. A heating and ventilating unit having a cold air inlet at its top, a cold air chamber at its bottom, a passage connecting the inlet and chamber, an opening at the front of the chamber, an opening at the rear of the chamber, a damper for closing the opening at the rear end of the chamber, and means for actuating the damper, including a thermal control unit and a thermal switch for controlling the operation of the unit.

15. A heating and ventilating unit comprising a casing having a cold air inlet passage at its back and extending the entire length of the casing, an air inlet chamber at the bottom of the casing provided with a plurality of openings, a damper for controlling the functions of said openings, and means for actuating the damper including a thermal control unit and a toggle connection therefrom to the damper.

16. A unit for heating and ventilating having a casing provided with an inlet for cold air at its back near the top and with an outlet opening in its top near the front, and wherein the said inlet is connected by a back passage with a bottom damper chamber which has a restricted opening in its top, and said damper chamber having an opening in its front and an opening in its rear, a single damper operating to close the opening in rear of the damper chamber so that air may pass through the front thereof, through the casing, and from the latter through the outlet in the top thereof, and also operating to uncover the opening in the rear of the damper chamber and to cut off the passage of air through the chamber from the front and enabling the air to pass directly through the opening in the top of the damper chamber, through the casing and from the outlet at the top thereof, and means for actuating the damper whereby to perform the functions noted.

MICHAEL J. CALLAHAN.